United States Patent
Zhang (10) Patent No.: US 7,747,051 B2
(45) Date of Patent: *Jun. 29, 2010

(54) DISTANCE TRANSFORM BASED VESSEL DETECTION FOR NODULE SEGMENTATION AND ANALYSIS

(75) Inventor: Li Zhang, Skillman, NJ (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 940 days.

This patent is subject to a terminal disclaimer.

(21) Appl. No.: 11/537,675

(22) Filed: Oct. 2, 2006

(65) Prior Publication Data

US 2007/0086637 A1    Apr. 19, 2007

Related U.S. Application Data

(60) Provisional application No. 60/724,392, filed on Oct. 7, 2005.

(51) Int. Cl.
*G06K 9/00* (2006.01)
*G06K 9/46* (2006.01)

(52) U.S. Cl. .................. 382/128; 382/190; 128/922
(58) Field of Classification Search ................ None
See application file for complete search history.

(56) References Cited

U.S. PATENT DOCUMENTS

| | | | |
|---|---|---|---|
| 5,280,787 A * | 1/1994 | Wilson et al. | 600/456 |
| 2004/0184647 A1 * | 9/2004 | Reeves et al. | 382/131 |
| 2005/0110791 A1 * | 5/2005 | Krishnamoorthy et al. | 345/419 |
| 2005/0254697 A1 | 11/2005 | Zhang et al. | |
| 2006/0120585 A1 | 6/2006 | Zhang et al. | |
| 2007/0122078 A1 * | 5/2007 | Huo et al. | 385/39 |
| 2007/0217668 A1 * | 9/2007 | Bornemann et al. | 382/132 |

* cited by examiner

*Primary Examiner*—Charles Kim (57) ABSTRACT

A method and system for differentiating a vessel and a nodule within an image. The method and system first identifies a complex object in the image and then identifies portions of the complex object as a vessel or a nodule using a distance transform based method. A simplex object is identified in the image and the simplex object is identified as a vessel or a nodule using compactness values. Complex objects are analyzed using features in a distance transform map to identify a) nodule parts and b) vessels that are attached to or pass through the nodule parts.

27 Claims, 8 Drawing Sheets

DISTANCE TRANSFORM BASED VESSEL DETECTION FOR NODULE SEGMENTATION AND ANALYSIS

This application claims the benefit of U.S. Provisional Application No. 60/724,392 filed Oct. 7, 2005, which is incorporated herein by reference.

BACKGROUND OF THE INVENTION

The present invention relates generally to nodule segmentation, and more particularly to segmentation of nodules and vessels in Computed Tomography (CT) studies.

Lung cancer is a leading cause of cancer related death in the United States. However, when lung cancer is diagnosed and treated at its earlier and potentially more curable stage, better prognosis and higher survival rate can be achieved.

CT imaging uses x-ray equipment to obtain image data from different angles around the human body and then uses computer processing of the information to produce cross-sectional images of the body tissues and organs. CT imaging, which can provide detailed information regarding internal anatomic structures non-invasively, has been broadly used for early lung cancer screening and diagnosis. Using high-resolution volumetric pulmonary CT images, lung nodules, even with very small size, can be detected and the nodules followed through time to determine whether there are any changes in the nodules. Nodules are, for example, physical masses that have the radiographic appearances of hazy opacities in a CT image.

Nodules are more clearly shown in high resolution computed tomographic (HRCT) images than plain radiographs. In addition, the appearance of nodules in HRCT images is a highly significant finding as they often indicate the presence of an active and potentially treatable condition such as bronchioalveolar carcinomas or invasive adenocarcinoma.

Because nodules are typically associated with active lung disease, the presence of nodules often leads to further diagnostic evaluation, including, for example, lung biopsy. Thus, a computer-based segmentation can be of assistance to medical experts for diagnosis and treatment of certain types of lung disease. Accordingly, there is a need for a system and method of computer-based segmentation or differentiation of the nodules and the tissues that can be used to accurately and consistently segment nodules for quick diagnosis.

Figure 1:
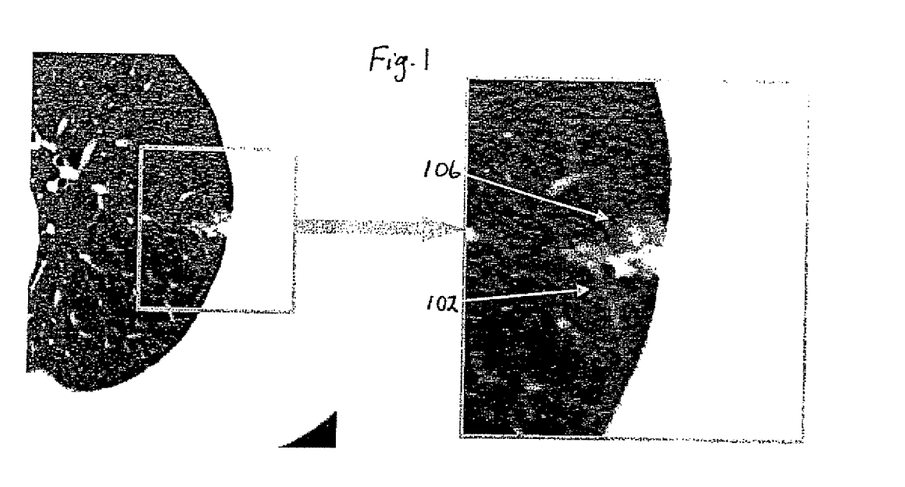
FIG. 1 shows a CT image showing a portion of a human lung.
Figure 2:
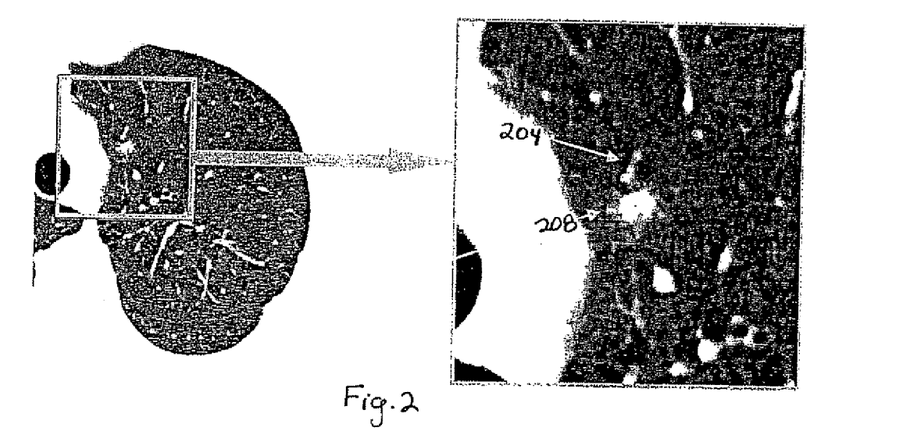
FIG. 2 shows a CT image showing a portion of a human lung.

While nodule volume measure and subsequent calculation of growth rate are important clinic indices for cancer diagnosis, a variety of computer-based methods have been developed for fast, accurate, and consistent nodule segmentation and volume measure. One of the most common difficulties for computer-based methods is to remove attached vessels from the nodule segmentation. FIGS. 1 and 2 show CT images and enlargements from the CT images of a section of the lung. As can be seen from the enlarged portions of FIGS. 1 and 2, vessels 102 and 204 have a similar intensities as nodules 106 and 208. Therefore, vessels, 102 and 204 may erroneously be included when attempting to segment or differentiate the nodules 106 and 208.

BRIEF SUMMARY OF THE INVENTION

The present invention is a method and system for differentiating a vessel and a nodule within an image. The method and system first identifies a complex object in the image and then identifies portions of the complex object as a vessel or a nodule using a distance transform based method. A simplex object is identified in the image and the simplex object is identified as a vessel or a nodule using compactness values. Complex objects are analyzed using features in a distance transform map to identify a) nodule parts and b) vessels that are attached to or pass through the nodule parts.

High intensity region within the image are grown with a local maximum transform value by gradually decreasing a distance threshold to identify the simplex object and identify the complex object. High intensity regions are classified by a maximum geodesic distance from the high intensity regions with a maximum distance transform value to identify the simplex object and the complex object. Compactness is calculated for the simplex object by a growing kernel.

Complex objects are further analyzed by identifying a region located on the nodule parts, and determining a connecting branch radius. The connecting branch radius is determined by finding the medium axis of a connecting branch of the vessels. The medium axis of the connecting branch of the vessels is found by calculating a vessel direction using a linear least squares fit. The vessels are segmented and differentiated from the nodules using a vessel model.

These and other advantages of the invention will be apparent to those of ordinary skill in the art by reference to the following detailed description and the accompanying drawings.

DETAILED DESCRIPTION

The following description describes the present invention in terms of the processing steps required to implement an embodiment of the invention. These steps may be performed by an appropriately programmed computer, the configuration of which is well known in the art. An appropriate computer may be implemented, for example, using well known computer processors, memory units, storage devices, computer software, and other components. A high level block diagram of such a computer and imaging system is shown in FIG. 3.

Figure 3:
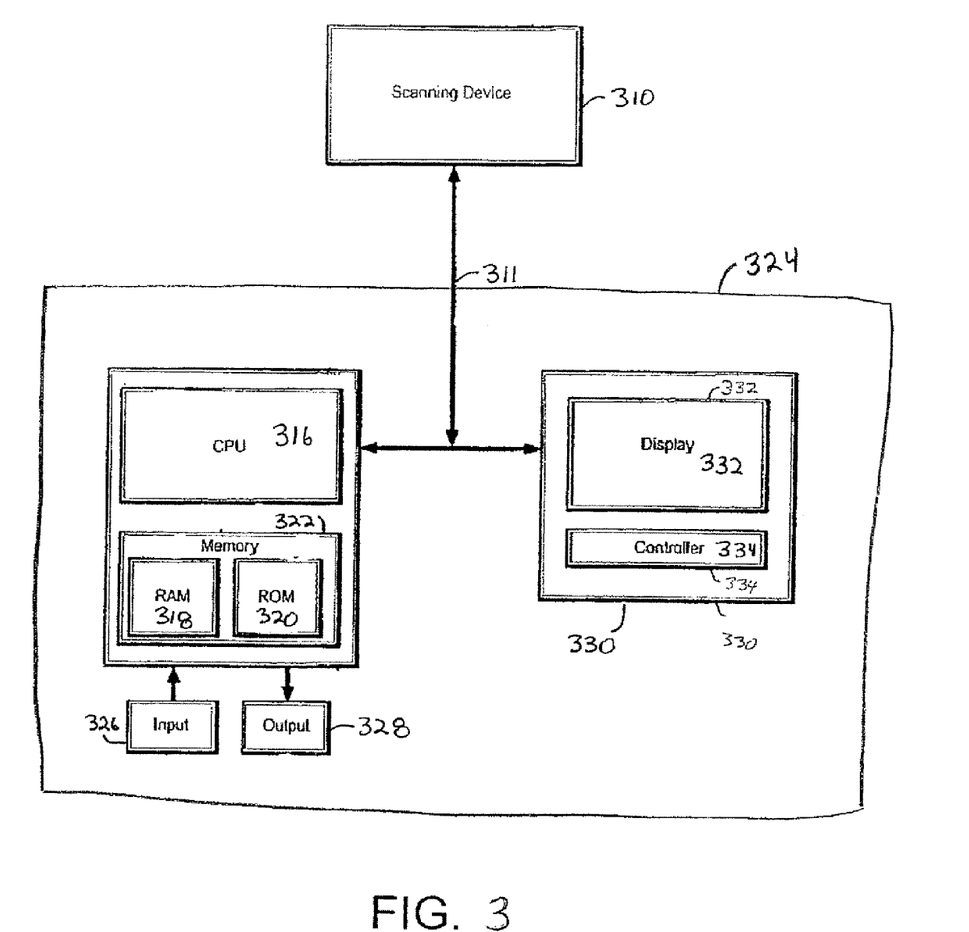
FIG. 3 is a high level block diagram of a computer and imaging system in accordance with an embodiment of the invention.

FIG. 3 is a block diagram of a suitable system for nodule segmentation and analysis according to an exemplary embodiment of the present invention. As shown in FIG. 3, the system includes, a scanning device 310, a computer 324 which may be a personal computer (PC), and an operator's console and/or virtual navigation terminal 330 connected or coupled directly or indirectly in any suitable and convenient manner, such as over an Ethernet network 311, for example. The scanning device 310 is preferably a computed tomography (CT) or high-resolution computed tomography (HRCT) imaging device.

The computer 324, which conveniently may be a portable or laptop computer, a desktop computer, a personal digital assistant (PDA), or other suitable form of computer, includes a central processing unit (CPU) 316 and a memory 322, which are coupled to an input 326 and an output 328.

Memory 322 includes a random access memory (RAM) 318 and a read only memory (ROM) 320. Memory 322 can also include a database, disk drive, tape drive, etc., or a combination thereof. RAM 318 functions as a data memory that stores data used during execution of a program in CPU 316 and is used as a work area. ROM 320 functions as a program memory for storing a program executed in CPU 316. Input 326 comprises a keyboard, a computer mouse, and/or other input devices, and output 328 comprises a display such as a liquid crystal display (LCD), cathode ray tube (CRT) display, printer, and so forth.

The operation of the system is controlled from the operator's console 330, which includes a controller 334, for example, a keyboard, and a display 332, for example, a CRT display. The operator's console 330 communicates with computer 324 and scanning device 310 so that two-dimensional (2D) image data collected by scanning device 310 can be rendered into 3D data by computer 324 and viewed on display 332. It is to be understood that computer 324 can be configured to operate and display information provided by scanning device 310 absent the operator's console 330, using, for example, input 326 and output 328 devices to execute certain tasks performed by controller 334 and display 332.

The operator's console 330 further includes any suitable image rendering system/tool/application that can process digital image data of an acquired image dataset (or portion thereof) to generate and display 2D and/or 3D images on display 332. More specifically, the image rendering system may be an application that provides 2D/3D rendering and visualization of medical image data, and which executes on a general purpose or specific computer workstation. Moreover, the image rendering system enables a user to navigate through a 3D image or a plurality of 2D image slices. Computer 324 may also include an image rendering system/tool/application for processing digital image data of an acquired image dataset to generate and display 2D and/or 3D images.

As shown in FIG. 3, computer 324 may receive and process digital medical image data, which as noted above, may be in the form of raw image data, 2D reconstructed data (e.g., axial slices), or 3D reconstructed data such as volumetric image data or multiplanar reformats, or any combination of such formats. The data processing results can be output from computer 324 via the coupling or connection path or network 311 to an image rendering system in the operator's console 330 for generating 2D and/or 3D renderings of image data in accordance with the data processing results, such as segmentation of organs or anatomical structures, color or intensity variations, and so forth.

One skilled in the art will recognize that an implementation of an actual computer will contain other components as well, and that FIG. 3 is a high level representation of some of the components of such a computer for illustrative purposes. In addition, one skilled in the art will recognize that the processing steps described herein may also be implemented using dedicated hardware, the circuitry of which is configured specifically for implementing such processing steps. Alternatively, the processing steps may be implemented using various combinations of hardware and software. Also, the processing steps may take place in a computer or may be part of a larger machine (e.g., a medical imaging machine).

Further, it is to be appreciated that exemplary systems and methods described herein can be readily implemented with 3D medical images and computer-aided diagnosis (CAD) systems or applications that are adapted for a wide range of imaging modalities (e.g., CT, MRI, etc.) and for diagnosing and evaluating various abnormal pulmonary structures or lesions such as lung nodules, tumors, stenoses, inflamed regions, etc. In this regard, although exemplary embodiments may be described herein with reference to particular imaging modalities or particular anatomical features, this should not be construed as limiting the scope of the invention.

It is to be further understood that the present invention may be implemented in various forms of hardware, software, firmware, special purpose processors, or a combination thereof. In one embodiment, the present invention may be implemented in software as an application program tangibly embodied on a program storage device (e.g., magnetic floppy disk, RAM, CD ROM, DVD, ROM, and flash memory). The application program may be uploaded to, and executed by, a computing machine comprising any suitable architecture.

The present invention discloses a novel technique to detect and segment pulmonary vessels using distance transform within a volume of interest (VOI) where nodules are being segmented and analyzed. To detect vessels, the regions with high intensity or brightness on a CT image are first identified using a known two-step Markov random field based method that is well known in the art. This method is disclosed in U.S. patent application Ser. No. 10/942,477 to Li Zhang, and Ming Fang, "Method and system for ground glass nodule (GGN) segmentation with shape analysis", filed Sep. 16, 2004 and U.S. patent application Ser. No. 11/010,813 to Li Zhang, and Ming Fang, "Method and system for ground class nodule (GGN) segmentation using a Markov random field and shape analysis", filed Dec. 13, 2004.

Figure 4:
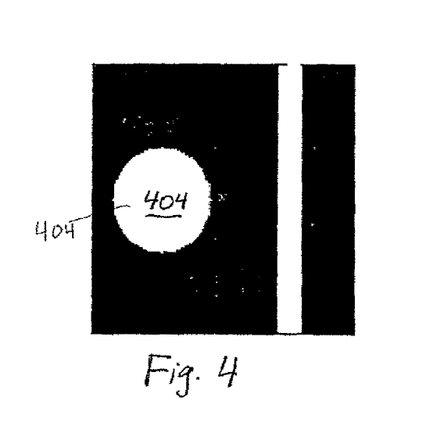
FIG. 4 shows a diagram of a vessel and a nodule.
Figure 5:
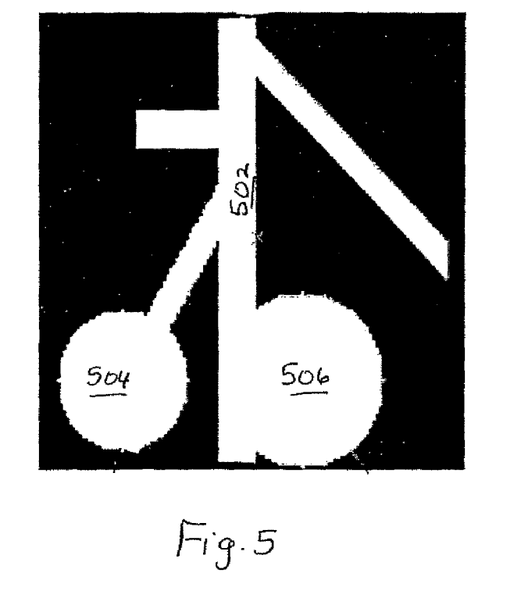
FIG. 5 shows a diagram of vessels and a nodules.

Images are acquired using the scanning device 110, for example, an HRCT scanner, to scan a lung thereby generating a series of 2D images associated with the lung. As shown in FIG. 4, the regions with high intensity may be a vessel 402 or a nodule 404. As shown in FIG. 5, the regions with high intensity may also be connected vessels 502 and nodules 504 and 506. The nodule 404 or vessel 402 are called simplex objects because they are separated from any other objects. The nodules 504 and 506 and vessels 502 shown in FIG. 5 are called complex objects because they are not separated. Simplex objects can be easily differentiated by compactness values since tube-like vessels 402 are much less compacted than sphere-like nodules 404 using a known method that is well known in the art. This method is disclosed in US Patent Application Publication No. 2007/0206864 "Method and System for Determining Compactness of an Object", published on Sep. 6, 2007. However, for complex objects, distinguishing between vessels and nodules becomes much more difficult and simple compactness checking will not work for this situation.

Figure 6:
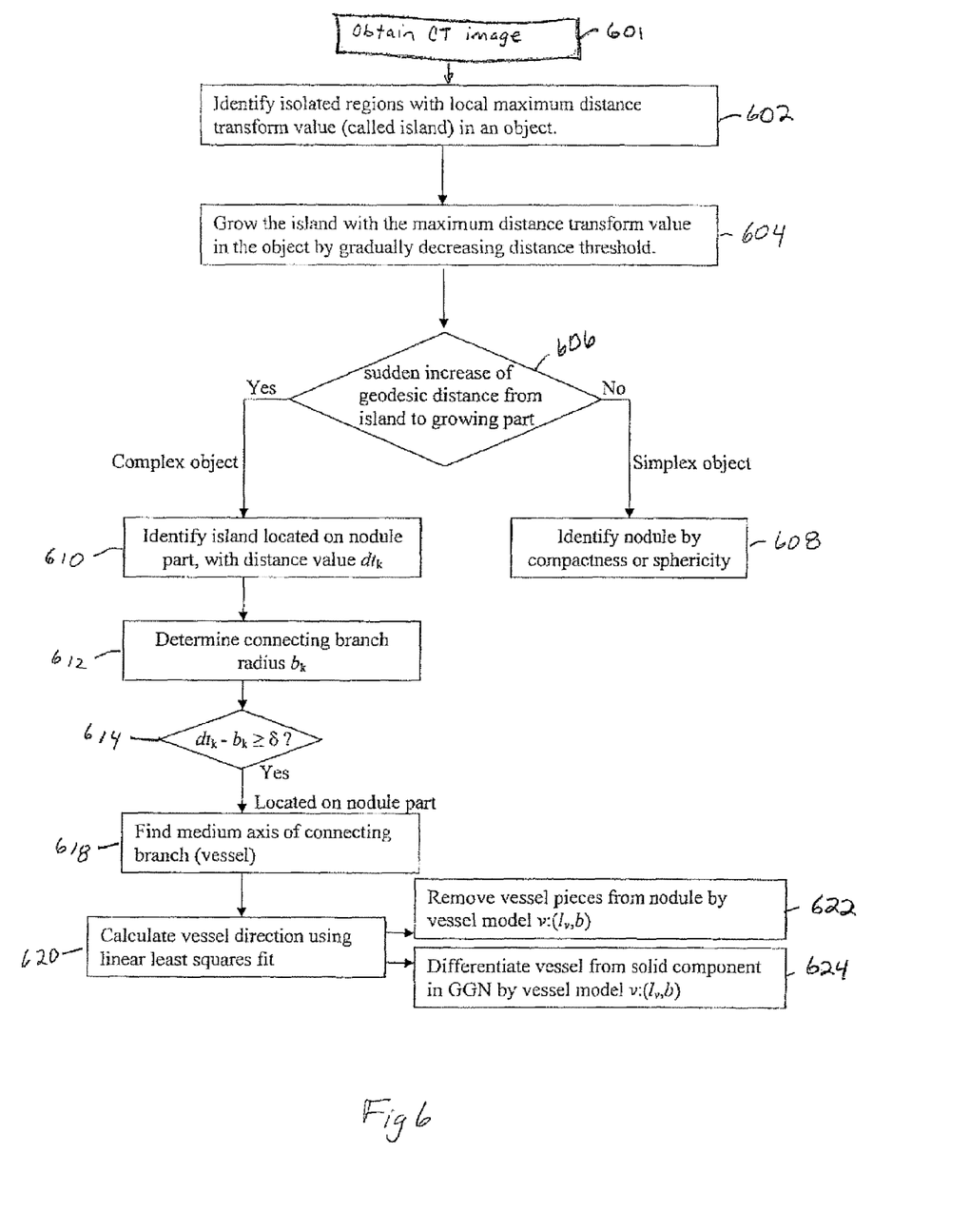
FIG. 6 shows a flowchart of the steps performed to perform the method in accordance with an embodiment of the invention.

FIG. 6 shows a flowchart illustrating the steps of a distance transform based method for vessel detection and nodule segmentation according to an exemplary embodiment of the present invention. The binary images, segmented from original CT images by the previously disclosed Markov random field based method, are transformed into a distance transform map, also known as distance map or distance field. A distance transform map is a representation of a digital image that supplies each pixel of the image with the distance to the nearest obstacle pixel. A common type obstacle pixel is a boundary pixel in a binary image.

Then, simplex and complex objects are classified. For simplex objects, compactness is checked to distinguish vessels from nodules as stated above. Then complex objects are analyzed using features in the distance transform maps to identify the nodule parts and the attaching or passing through vessels.

Figure 10:
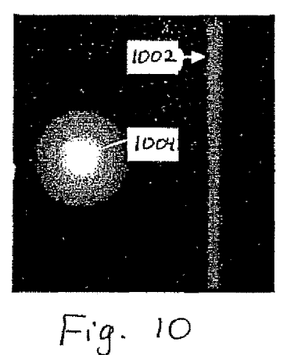
FIG. 10 shows a distance transform map of a vessel and a nodule.
Figure 11:
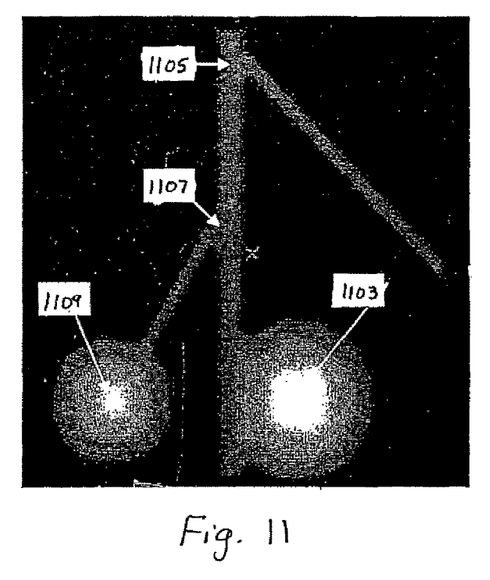
FIG. 11 shows a distance transform map of vessels and a nodules.

First, at step 601, a CT image of the area to be studied is obtained. Then, in step 602 high intensity regions are isolated. Isolated regions with local maximum distance transform values (called islands) in an object are identified. As shown in FIGS. 10 and 11, which are distance transform maps, the isolated regions with a local maximum distance transform value, such as region 1004 and 1002, and regions 1103, 1105, 1107 and 1109 are defined as islands, and the voxels in an island are called island voxels. A voxel is a unit of volume corresponding to the smallest element depicted in a three-dimensional CT image. The distance transform value $dt(\bar{r})$ for an island voxel $\bar{r}$ must be no less than the distance values of its nearest neighbors, i.e., $dt(\bar{r}) \geq dt(\bar{r}_p)$, $\bar{r}_p \in NN_{\bar{r}}$, where $NN_{\bar{r}}$ is the set of all nearest neighbors of island voxel $\bar{r}$.

Returning to FIG. 6, in step 604, the islands are grown, according to known techniques, to remove the areas that are not desired and thus their potential influence is removed. It is to be understood that a variety of segmentation techniques may be used in the preprocessing in addition to region growing. The growing technique is disclosed in, Arthur R. Weeks, "Fundamentals of Image Processing," IEEE Press, New York 1996, pp. 442 et seq., 448 et seq.; Gonzalez and Woods, "Digital Image Processing," Prentice-Hall, New Jersey 2002, p. 612 et seq.; Milan Sonka et al. "Image Processing, Analysis, and Machine Vision," 2.sup.nd ed., PWS Publishing, New York, 1999, p. 176 et seq., inter alia.

Figure 8A:
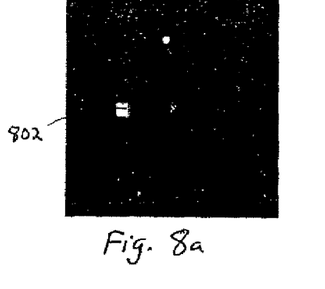
FIG. 8 shows examples of a simplex object using a distance value thresholding technique.
Figure 8B:
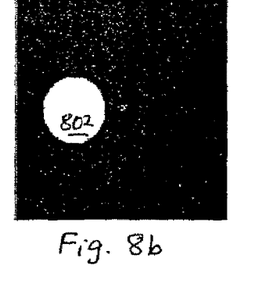
Figure 8C:
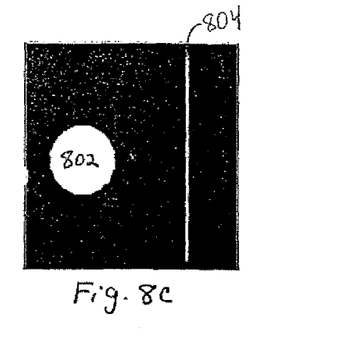

The islands are grown with the maximum distance transform value in the object by gradually decreasing the distance threshold. After islands are identified, simplex and complex objects can be classified by the maximum geodesic distance. The geodesic distance $d_X(x_i, x_j)$ between two points $x_i$, $x_j$ in set X is defined as the shortest path from $x_i$ to $x_j$ while this shortest path P is contained in X, i.e., $P \subseteq X$. For a simplex object, the island with the maximum distance transform value in the object is grown gradually, then the maximum geodesic distance from the island to the other voxels within the object will increase gradually also. As shown in FIGS. 8a-8c, simplex object 802 is shown. In FIG. 8a, simplex object 802 is shown using a distance threshold of 21. In FIG. 8b, simplex object 802 is shown using a distance threshold of 7. In FIG. 8c, simplex object 802 is shown along with simplex object 804 using a distance threshold of 6.

Figure 9A:
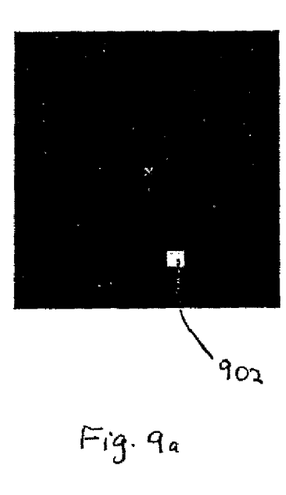
FIG. 9 shows examples of a complex object using a distance value thresholding technique.
Figure 9B:
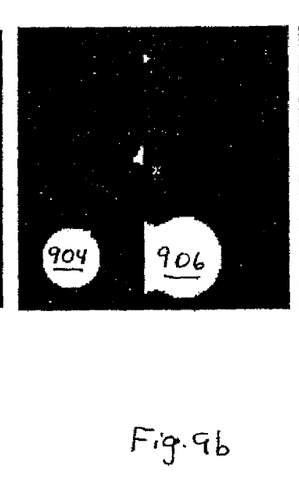
Figure 9C:
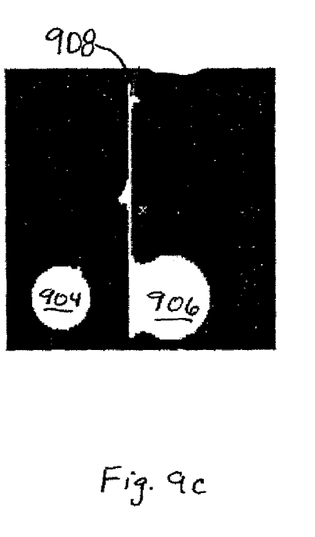

For a complex object, the geodesic distance will increase suddenly at some growing point, for example, from distance threshold T=7 to T=6 as shown in FIGS. 9b-9c. FIG. 9a shows a complex object 902 using a distance threshold of 21. As the distance threshold is decreased, nodules 904 and 906 become visible in FIG. 9b using s distance threshold of 7. As shown in FIG. 9c the distance threshold is decreased again to 6, vessel 908 also becomes visible.

In step 606, it is determined if there is a sudden increase of geodesic distance from the island to the growing part. If there is a sudden increase of geodesic distance from the island to the growing part then the object is a complex object. If there is not a sudden increase of geodesic distance from the island to the growing part, then the object is a simplex object. This step, 606, is further detailed in FIG. 7. Simplex and complex objects can be classified using the following steps. First, in step 702, for an object, the initial distance threshold $T_0$ is set to the maximum distance value $dt_M$ in O. Then the thresholded image, $F(T_0) = \{\bar{x} | dt(\bar{x}) \geq T_0, \bar{x} \in O\}$, only includes the island with the maximum distance value, $R_M = \{\bar{r} | dt(\bar{r}) = dt_M\}$, at this step.

Figure 7:
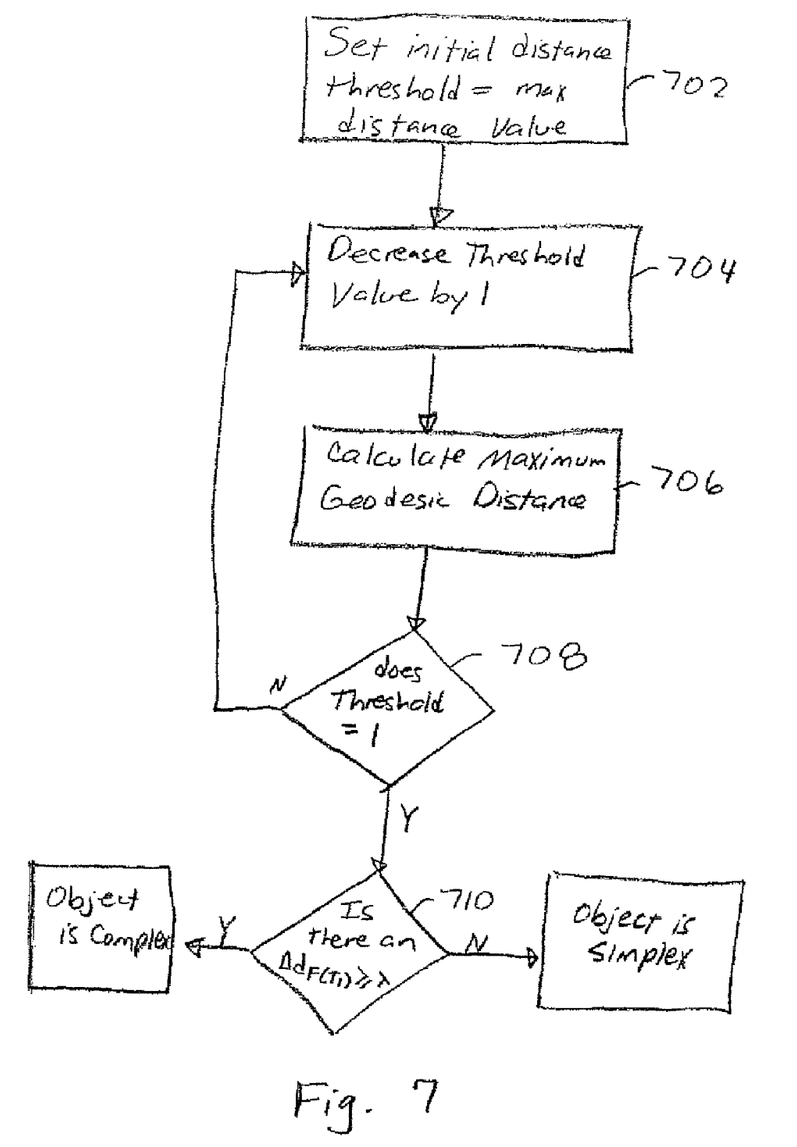
FIG. 7 shows a flowchart of the steps performed to perform the method in accordance with an embodiment of the invention.

Next, at step 704, the threshold value T is decreased by one, (e.g., $T_i = T_{i-1} - 1$), to obtain an updated $F(T_i) = \{\bar{x} | dt(\bar{x}) \geq T_i, \bar{x} \in O\}$. Then, at step 706, the maximum geodesic distance is calculated $d_{F(T_i)}(R_M, R_M^*)$ from $R_M$ to the other voxels in $F(T_i)$, where $R_M^* = F(T_i) - R_M$. Where $g(\bar{x}, \bar{r})$ denotes the geodesic distance between $\bar{r} \in R_M$ and $\bar{x} \in R_M^*$, then $$d_{F(T_i)}(R_M, R_M^*) = \operatorname*{argmax}_{\bar{x}} \left\{ \operatorname*{argmin}_{\bar{r}} \{g(\bar{x}, \bar{r})\} \right\}.$$

At step 708, it is determined if $T_i = 1$. If $T_i \neq 1$, then the process goes back to step 704, where the threshold value is reduced by one, and the process continues to step 706 and then back to 708. If $T_i = 1$ then the process goes to step 710. At step 710 it is determined whether $\Delta d_{F(T_i)} = d_{F(T_i)}(R_M, R_M^*) - d_{F(T_{i-1})}(R_M, R_M^*) \geq \lambda$, where $\lambda$ is a pre-determined constant much larger than 1, ($\lambda$ can be set to 5 initially, and further fine-tuned by experimental results). If $\Delta d_{F(T_i)} \geq \lambda$ for an object, then this object is a complex object. Otherwise, if the term $\Delta d_{F(T_i)} \geq \lambda$ is not true before reaching $T_i = 1$, for an object, then the object is a simplex object.

Returning now to FIG. 6, at step 608, for a simplex object, compactness measurement can be used to differentiate vessels and nodules. Compactness of an object can be calculated by a growing kernel method. A kernel starts to grow at the geometric center of the object, let $R_{begin}$ denote the kernel radius when some voxel of the kernel grows outside of the object, and $R_{end}$ denote the kernel radius when the kernel completely covers the object, then the object compactness $C_{KN}$ can be calculated by either of the following two equations.

$$C_{KN} = \frac{C_K - C_{Kmin}}{C_{Kmax} - C_{Kmin}},$$

$$C_{KN} = \frac{C_K}{C_{Kmax}}$$

where $$C_k = R_{end} / R_{begin}, \quad C_{Kmin} = 1, \quad C_{Kmax} = \frac{V}{2},$$

and V is the volume of the given object.

Once the complex objects have been identified in step 606, in step 610, the island located on a nodule part is identified, with a distance value. For a complex object O, the steps in FIG. 7 are applied to each island by changing the initial threshold $T_0$, i.e., for island $R_k$ with maximum distance transform value $dt_k$, set $T_0 = dt_k$. In step 612, the connecting branch radius is determined. The connecting branch radius is the threshold where the two items first appear differentiated. When $\Delta d_{F(T_i)} \geq \lambda$ is found for island $R_k$, the radius $b_k$ of the connecting branch for island $R_k$ can then be obtained, $b_k = T_i$.

In step 614, it is determined whether, for an island $R_k$, if $dt_k - b_k \geq \delta$, where $\delta$ is a pre-determined constant, then $R_k$ is located on a nodule part of the complex object O (such as regions 1109 and 1103 in FIG. 11); otherwise, $R_k$ is located on other structures, such as bifurcations of two vessels (such as regions 1105 and 1107 in FIG. 11).

If the island is located on the nodule part, then at step 618, the medium axis of the connecting branch of the vessel is found. $R_{nod}$ denotes an island located on a nodule part, and $b_{nod}$ denotes the radius of its connecting branch (vessel). Then region growing is applied from $R_{nod}$ to include connected voxels with distance value greater than or equal to $b_{nod}+1$. This region growing result is denoted as $S_{b_{nod}+1}(R_{nod})$ and let $S_{b_{nod}}(R_{nod})$ denote the region regrowing result with threshold $b_{nod}$. Then the medium axis $A_{nod}$ of the connecting vessel for $R_{nod}$ can be obtained as follows $$A_{nod}=S_{b_{nod}}(R_{nod})-S_{b_{nod}+1}(R_{nod}) \circ SE_3,$$

where $\circ$ denotes morphological dilation, and $SE_3$ is a 3×3×3 cubic structure element.

In step 620, the vessel direction is calculated using the linear least squares fit method. The voxels in $A_{nod}$ can be fitted by a straight line $l_v$ using linear least squares fit. If the maximum error $E(l_v)$ between the voxels in $A_{nod}$ and the fitted line $l_v$ is larger than a small constant $\epsilon$, which means $A_{nod}$ is too curved to be fitted by a straight line, then 25% voxels of $A_{nod}$ on the end farther from $R_{nod}$ are removed, and $l_v$ is re-computed. This process is repeated until $E(l_v) \leq \epsilon$. Then the vessel can be modeled by $l_v$ and vessel radius $b_{nod}$, $v:(l_v, b_{nod})$, for vessel removal in nodule segmentation or vessel and solid component differentiation in ground glass nodules (GGNs).

Then, in steps 622 and 624 the vessel detection results are applied to the complex objects. At step 622, the vessel pieces are removed from the nodule by the vessel model. Based on vessel detection results, the following equations can be used to remove vessels in nodule segmentation Let $$Nod_{+\nu}=S_{b_{nod}+1}(R_{nod})[\circ SE_3]^{b_{nod}},$$

where $[\circ SE_3]^{b_{nod}}$ denote $b_{nod}$ times dilation with structure element $SE_3$. $Nod_{+\nu}$ is the basic shape of nodule segmentation, however, it includes some vessel pieces which are attached to the nodule. The included vessel pieces can be removed by vessel model $v:(l_v, b_{nod})$ as follows $$Nod=Nod_{+\nu}-(Nod_{+\nu} \cap l_v [\circ SE_3]^{b_{nod}})$$

in step 624, which follows directly from step 620, the vessel is differentiated from the solid components in ground glass nodules (GGNs) by the vessel model. To differentiate vessels from solid nodules, the bright regions $B_n$, n=1, 2, ... are found in nodules, then the vessels are removed from these bright regions by the vessel model $v:(l_v, b_{nod})$ as follows $$\hat{B}_n = B_n - (B_n \cap l_v [\circ SE_3]^{b_{nod}}), n=1, 2, \ldots$$

$\hat{B}_n$ is then considered as the candidates for further solid components segmentation and analysis.

The foregoing Detailed Description is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that various modifications may be implemented by those skilled in the art without departing from the scope and spirit of the invention. Those skilled in the art could implement various other feature combinations without departing from the scope and spirit of the invention.

What is claimed is:

1. A method for differentiating a vessel and a nodule within an image comprising:
    identifying a complex object in said image;
    identifying portions of the complex object as a vessel or a nodule using a distance transform based method; and
    segmenting the vessels from the nodule using a vessel model determined based on the distance transform based method;
    wherein the step of identifying a complex object in said image comprises:
        growing a high intensity region within the image with a local maximum transform value by gradually decreasing a distance threshold; and
        classifying the high intensity region as one of a complex object and a simplex object based on a change in maximum geodesic distance between voxels in the high intensity region as the distance threshold is gradually decreased.

2. The method of claim 1 and further comprising:
    identifying a simplex object in said image; and
    identifying the simplex object as a vessel or a nodule using compactness values.

3. The method of claim 2 further comprising the step of growing a high intensity region within the image with a local maximum transform value by gradually decreasing a distance threshold to identify the simplex object and identify the complex object.

4. The method of claim 2 further comprising the step of classifying high intensity regions by a maximum geodesic distance to the simplex object and the complex object.

5. The method of claim 2 wherein the step of identifying the simplex object further comprises calculating the compactness of the simplex object by a growing kernel.

6. The method of claim 1 wherein the step of identifying portions of the complex object further comprises:
    analyzing the complex objects using features in a distance transform map to identify a) nodule parts and b) vessels that are attached to or pass through the nodule parts.

7. The method of claim 6 wherein the step of analyzing the complex object further comprises identifying a region located on the nodule parts.

8. The method of claim 7 wherein the step of identifying a region located on the nodule part further comprises determining a connecting branch radius.

9. The method of claim 8 wherein the step of determining a connecting branch radius further comprises finding the medium axis of a connecting branch of the vessels.

10. The method of claim 9 wherein the step of finding the medium axis of the connecting branch of the vessels further comprises calculating a vessel direction using a linear least squares fit.

11. The method of claim 10 further comprising the step of differentiating the vessel from the nodule using a vessel model.

12. A system for differentiating a vessel and a nodule within an image comprising:
    means for identifying a complex object in said image;
    means for identifying portions of the complex object as a vessel or a nodule using a distance transform based method; and
    means for segmenting the vessels from the nodule using a vessel model determined based on the distance transform based method;
    wherein the means for identifying a complex object in said image comprises:
        means for growing a high intensity region within the image with a local maximum transform value by gradually decreasing a distance threshold; and
        means for classifying the high intensity region as one of a complex object and a simplex object based on a change in maximum geodesic distance between voxels in the high intensity region as the distance threshold is gradually decreased.

13. The system of claim 12 and further comprising:
means for identifying a simplex object in said image; and
means for identifying the simplex object as a vessel or a nodule using compactness values.

14. The method of claim 12 wherein the step of identifying portions of the complex object further comprises:
means for analyzing the complex objects using features in a distance transform map to identify a) nodule parts and b) vessels that are attached to or pass through the nodule parts.

15. The system of claim 14 wherein the means for analyzing the complex object further comprises means for identifying a region located on the nodule parts.

16. The system of claim 15 wherein the means for identifying a region located on the nodule parts further comprises means for determining a connecting branch radius.

17. The system of claim 16 wherein the means for determining a connecting branch radius further comprises means for finding the medium axis of a connecting branch of the vessels.

18. The system of claim 17 wherein the means for finding the medium axis of the connecting branch of the vessel further comprises means for calculating a vessel direction using a linear least squares fit.

19. The system of claim 18 further comprising means for differentiating the vessel from solid nodule parts in a ground glass nodule using a vessel model.

20. The system of claim 13 wherein the means for identifying the simplex object further comprises means for calculating the compactness of the simplex object by a growing kernel.

21. A non-transitory computer readable medium comprising computer program instructions which, when executed by a processor, define steps for differentiating a vessel and a nodule within an image, said steps comprising:
identifying a complex object in said image;
identifying portions of the complex object as a vessel or a nodule using a distance transform based method; and
segmenting the vessels from the nodule using a vessel model determined based on the distance transform based method;
wherein the step of identifying a complex object in said image comprises:
growing a high intensity region within the image with a local maximum transform value by gradually decreasing a distance threshold; and
classifying the high intensity region as one of a complex object and a simplex object based on a change in maximum geodesic distance between voxels in the high intensity region as the distance threshold is gradually decreased.

22. The computer readable medium of claim 21 wherein the step of identifying the portions of the complex object further comprises:
analyzing the complex objects using features in a distance transform map to identify a) nodule parts and b) vessels that are attached to or pass through the nodule parts.

23. The computer readable medium of claim 22 wherein the step of analyzing the complex object further comprises identifying a region located on the nodule parts.

24. The computer readable medium of claim 23 wherein the step of identifying a region located on the nodule parts further comprises determining a connecting branch radius.

25. The computer readable medium of claim 24 wherein the step of determining a connecting branch radius further comprises finding the medium axis of a connecting branch of the vessels.

26. The computer readable medium of claim 25 wherein the step of finding the medium axis of the connecting branch of the vessel further comprises calculating a vessel direction using a linear least squares fit.

27. The computer readable medium of claim 26 further comprising the step of differentiating the vessel from solid nodule parts in a ground glass nodule using a vessel model.

* * * * *